US00RE41388E

(19) United States
(12) Reissued Patent
Brown et al.

(10) Patent Number: US RE41,388 E
(45) Date of Reissued Patent: Jun. 22, 2010

(54) SIGNAL TRANSMITTING CABLE

(75) Inventors: George Henry Platt Brown, Hawick (GB); David John Stockton, Hawick (GB); Greig Iain McIlwraith, Hawick (GB)

(73) Assignee: Emtelle UK Limited (GB)

(21) Appl. No.: 12/105,859

(22) PCT Filed: Jun. 26, 2003

(86) PCT No.: PCT/GB03/02762

§ 371 (c)(1),
(2), (4) Date: Sep. 21, 2004

(87) PCT Pub. No.: WO2004/015475

PCT Pub. Date: Feb. 19, 2004

Related U.S. Patent Documents

Reissue of:
(64) Patent No.: 7,136,556
Issued: Nov. 14, 2006
Appl. No.: 10/486,674
Filed: Sep. 21, 2004

(30) Foreign Application Priority Data

Aug. 10, 2002 (GB) ..... 021864
Sep. 26, 2002 (GB) ..... 0222256
Jun. 6, 2003 (GB) ..... 0313018

(51) Int. Cl.
*G02B 6/44* (2006.01)

(52) U.S. Cl. ..... 385/102; 385/100
(58) Field of Classification Search ..... 385/100–114
See application file for complete search history.

(56) References Cited

U.S. PATENT DOCUMENTS 3,814,499 A 6/1974 Marcatili
4,515,435 A * 5/1985 Anderson ..... 385/103
4,673,516 A 6/1987 Berry (Continued)

FOREIGN PATENT DOCUMENTS

AU 2003251135 8/2006

(Continued)

OTHER PUBLICATIONS

Standard European Search Report #RS 108935 GB, Jan. 31, 2003, European Search Report of United Kingdom Patent Application GBA 0218624.
Standard European Search Report #RS 109039 GB, Jan. 31, 2003, European Search Report of United Kingdom Patent Application GBA 0222256.
PCT/GB03/02762 Invitation to Pay Additional Fees with Partial Search Report, Feb. 9, 2004, International Searching Authority.

*Primary Examiner*—Charlie Peng
(74) *Attorney, Agent, or Firm*—Daniel B. Schein, Esq.

(57) ABSTRACT

A fibre optic cable includes a core of primary coated optical fibres embedded in an inner layer of acrylate material, having sufficient tensile strength when cured to lock at least the outermost fibres in place and still allow the fibres to be easily broken out of the assembly for termination and splicing purposes. The hardness of the acrylate layer is such that at least the outermost fibres of the bundle are restricted from moving axially relative to the inner layer. The inner layer is then surrounded by a loose thin jacket formed from a mixture of high density polyethylene having a Shore hardness greater than or equal to 60 and a generally uniformly distributed slip agent, including a polyether modified poly (dimethylsiloxane) material such as polyether modified hydroxy functional poly (dimethylsiloxane) material. The mixture from which the outer layer is formed is compacted by means of heat and pressure. The outer layer may also contain a mineral filler, such as calcium carbonate and/or titanium dioxide, in order to improve the stability of the dimensions of the outer layer as the temperature changes.

54 Claims, 5 Drawing Sheets

U.S. PATENT DOCUMENTS

| | | | | | |
|---|---|---|---|---|---|
| 4,687,294 | A | | 8/1987 | Angeles | |
| 4,740,053 | A | | 4/1988 | Cassidy | |
| 4,781,433 | A | | 11/1988 | Arroyo et al. | |
| 4,946,237 | A | | 8/1990 | Arroyo et al. | |
| 4,952,021 | A | | 8/1990 | Aoki et al. | |
| 4,976,519 | A | | 12/1990 | Davey et al. | |
| 5,208,890 | A | | 5/1993 | Kohler et al. | |
| 5,487,126 | A | | 1/1996 | Oestreich et al. | |
| 5,557,703 | A | | 9/1996 | Barker et al. | |
| 5,621,842 | A | | 4/1997 | Keller | |
| 5,751,879 | A | * | 5/1998 | Graham et al. | 385/103 |
| 5,761,361 | A | | 6/1998 | Pfandl et al. | |
| 5,787,217 | A | | 7/1998 | Traut et al. | |
| 6,035,087 | A | | 3/2000 | Bonicel et al. | |
| 6,046,302 | A | | 4/2000 | Buning et al. | |
| 6,334,015 | B2 | | 12/2001 | Jamet | |
| 6,374,023 | B1 | | 4/2002 | Parris | |
| 6,912,347 | B2 | * | 6/2005 | Rossi et al. | 385/112 |

FOREIGN PATENT DOCUMENTS

| | | | |
|---|---|---|---|
| CN | 03818287.4 | | 10/2006 |
| DE | 3144182 | A1 | 5/1983 |
| DE | 4211489 | A1 | 10/1993 |
| DE | 19520978 | A1 | 12/1996 |
| DE | 29620962 | U1 | 1/1997 |
| EP | 0108590 | A1 | 5/1984 |
| EP | 0296836 | | 12/1988 |
| EP | 0296836 | A1 | 12/1988 |
| EP | 0405851 | A1 | 1/1991 |
| EP | 0442308 | A3 | 8/1991 |
| EP | 0456909 | A2 | 11/1991 |
| EP | 0521710 | A1 | 1/1993 |
| EP | 0553990 | A1 | 4/1993 |
| EP | P400714 | | 7/2005 |
| EP | 03784229.1-1234 | | 7/2005 |
| EP | 05019312.7-1234 | | 7/2006 |
| GB | 2065324 | A | 6/1981 |
| GB | 2086607 | A | 5/1982 |
| GB | 2145841 | A | 3/1985 |
| GB | 2156837 | A | 10/1985 |
| GB | 2184563 | | 6/1987 |
| GB | 2214652 | A | 9/1989 |
| GB | 0415890.3 | | 9/2004 |
| GB | 0415890.3 | | 3/2005 |
| GB | 0415890.3 | | 5/2005 |
| GB | 0504489.6 | | 5/2005 |
| GB | 0504492.0 | | 5/2005 |
| GB | 0504489.6 | | 9/2005 |
| IN | 287/DELNP/2005 | | 7/2007 |
| JP | 60033519 | | 2/1985 |
| JP | 60057304 | | 3/1985 |
| KR | 10-2005-7002202 | | 2/2007 |
| KR | 2001-95454 | | 11/2007 |
| NZ | 538126 | | 5/2005 |
| NZ | 544210 | | 12/2005 |
| SG | 200500569-9 | | 8/2006 |
| WO | 0060393 | | 10/2000 |

* cited by examiner

Coefficient of friction is given by $$\mu = \frac{1}{\theta} \ln\left[\frac{FL}{Tr} + 1\right]$$

Where

| | |
|---|---|
| $\theta$ | total wrap angle of tube (rads) |
| F | force recorded at mass balance (N) |
| L | Moment arm length of force F (m) |
| T | Weight lifted by fibre (N) |
| r | Bend vradius of primary tube (m) |

SIGNAL TRANSMITTING CABLE

Matter enclosed in heavy brackets [ ] appears in the original patent but forms no part of this reissue specification; matter printed in italics indicates the additions made by reissue.

The present invention relates to signal transmitting cables, and relates particularly, but not exclusively, to optical cables to be installed in ducts by blowing.

EP0108590 discloses a process by which optical fibre cables are installed in ducts by means of fluid drag using the blowing method. This process now represents the most significant method by which optical fibres are installed and there has been a great deal of development work aimed at optimizing both the installation performance and the signal carrying performance of such cables.

This installation method, which distributes the installation force evenly along the entire length of the cable, has enabled the development of cables which do not contain any reinforcement and which are very small and lightweight. This has brought new factors into play that affect the installation performance. In particular, static electricity can create a sufficiently strong attraction between the small ligthweight cable and the tube into which it is being installed to create very high levels of friction which might prevent satisfactory installation being achieved.

There are a large number of other factors apart from friction and static electricity which affect the installation performance of a fibre optic cable. For example, the stiffness of the cable is important since the installation force is partly generated by pushing, the surface finish of the cable is important because it affects the viscous drag characteristics of the cable, and the pressure of the air and hence the volume of air flow generated in the tube affect the installation force generated from viscous drag.

GB2156837 discloses a method for improved insertion and withdrawal of an optical fibre member by propelling the fibre member by means of fluid drag through a pathway of a conduit which is obtained by the addition to the conduit material, or the sheath material of the fibre member, of an adherence substance such as an antistatic agent, slip agent, or anti-block agent, or a combination of these.

Attention has focused on development of cables, as a result of which there has not been significant development of the tubes into which the cables are installed.

U.S. Pat. No. 4,740,053 describes an optical fibre cable comprising an inner sheath which may comprise a coating applied to the optical fibres or may be formed by an extrusion about the fibres. The inner sheath holds a plurality of optical fibres locked together in a unitary matrix. This has the benefit of providing stiffness, useful for pushing the cable into the duct in the initial phase of the process of blowing the cable into a duct. The outer sheath comprises cellular material of low density and substantially greater cross sectional area than the inner sheath. The material of the outer sheath may advantageously be chosen to accept antistatic, antifriction agents and the like, and the outer sheath is conventiently directly adhered to the inner sheath.

U.S. Pat. No. 4,952,021 discloses a similar arrangement to that disclosed in U.S. Pat. No. 4,740,053 above, but also discloses that the antistatic and antifriction agents can be incorporated in both the tube and the outermost layer of the cable. In this case seven individual fibres are first coated with a solid layer of nylon to an outside diameter of 1 mm and then a foamed low density polyethylene outer layer is applied to achieve a final outside diameter of 2 mm. Low density polyethylene is generally selected because it foams more easily than high density polyethylene and creates a relatively soft outer layer which can be easily removed to expose the individual fibres.

This type of construction is thought to be beneficial primarily because the foam outer layer provides a large increase in diameter for a small increase in weight. A foam polyethylene is usually the polymer of choice and typically the density of the material might be reduced from 0.93 gms/cc to 0.5 gms/cc. This creates a large increase in diameter for a relatively small gain in weight and also produces a slightly rough surface. Both these create an increase in viscous drag which is directly related to the diameter of the object and also to the surface roughness.

This design suffers from some significant disadvantages, however. The friction characteristics of low density polyethylene are quite poor despite the addition of antifriction agents. Also, whilst the increase in diameter created by the foam outer layer increases fluid drag, it also serves to choke off the air flow down the tube as the cable is installed. This means that relatively large tubes need to be used to achieve satisfactory installation distances. The requirement is generally to use smaller tubes in order to optimise the use of already congested networks. A further disadvantage is that manufacturing the foam outer layer is problematic with inconsistencies in foam density adversely affecting the optical properties and hence signal transmitting capability of the fibres.

EP0521710 discloses an alternative design for a fibre optic cable which is much more compact and is designed to provide significantly improved installation performance and in particular allow the use of smaller tubes. This document discloses a fibre optic cable consisting of more than one layer, where the outer surface or layer has been modified to obtain the benefit of increased fluid drag and reduced friction. A rough surface has the benefit of increasing the effective outside diameter without increasing the weight to the same extent as a cable of the same diameter having a smooth external surface. Increasing the effective diameter increases the fluid drag. In addition, rough surfaces intrinsically have higher fluid drag coefficients. Finally, rough surfaces reduce the number of contact points between the cable and the tube and therefore reduce friction between the cable and the tube. All of these factors improve installation characteristics and blowing distances.

However, it is also well known that manufacturing such cables with rough surfaces is problematic. In particular, the attachment of glass microspheres as a means of providing a rough surface is known to cause a weakening of the surface coating, which can create fluid break out, where the individual fibres break out of the coating, causing microbending and create unacceptable signal losses. Another problem of such cables is that the microspheres can become detached, creating a potential hazard during installation by blowing.

EP 646818 discloses a method for overcoming some of the disadvantages of this manufacturing technique by means of the application of three separate layers, making the process relatively complex, expensive and more difficult to control.

Also, in the case of the prior art cables described in EP646818 and EP0521710, the different layers of the coating are bonded to each other or at least in intimate contact with each other. In order to terminate or splice the cable it is necessary to break the individual fibres out of the coating layers. The individual fibres are quite delicate and the coating layers are in intimate contact with the fibres. It is therefore important that the coating layers are relatively soft and easy to remove. A disadvantage of such soft materials, however, is that they tend to have poor friction properties compared to harder materials and are more easily damaged, in particular by abrasion during installation.

U.S. Pat. No. 4,952,021 and U.S. Pat. No. 4,740,053 disclose arrangements in which all the layers of the coating are in intimate contact with neighbouring layers. In the case of the cable of U.S. Pat. No. 4,740,053, the outer layer is conveniently directly adhered to the inner sheath. U.S. Pat. No. 4,740,053 states that the inner sheath is formed from a relatively high density material having a high modulus of elasticity, and also a relatively hard and tough material. U.S. Pat. No. 4,952,021 describes a cable in which seven fibres are first coated with a nylon layer, a relatively hard and tough material. It has been the practice therefore for such cables to be provided with a rip cord positioned adjacent to the fibres in the centre of the cable which could be pulled to cut open the tough inner layer so that access can be gained for terminating and splicing the individual fibres. A disadvantage of this approach, however, is that such rip cords are expensive and undesirably increase the size of the assembly.

Preferred embodiments of the present invention seek to overcome the above disadvantages of the prior art.

According to an aspect of the present invention, there is provided a cable assembly comprising a plurality of flexible signal transmitting members surrounded by a first layer such that axial movement of at least the outermost signal transmitting members relative to said first layer is restricted, and a continuous thermoplastic polymer second layer arranged outwardly of said first layer such that the hardness of the polymer of the second layer is greater than or equal to a Shore D hardness of 60.

The present invention is based on the surprising discovery that lightweight fibre optic cables with excellent optical and blowing properties can be manufactured by providing an outer layer of the cable formed form at least one polymer material, even in the case of a smooth outer layer, if the hardness of the outer layer is insufficient. The polymer may be conveniently modified to provide suitable antistatic and antifriction properties. This avoids the complex production problems associated with the production of a rough outer surface by the application of glass microspheres, foamed thermoplastics, and the like. This result is surprising firstly because the high fluid drag provided by a rough outer surface is generally regarded as persons skilled in the art as essential to providing good blowing performance. Secondly, whilst the friction characteristics of the outer layer of the invention are good relative to some polymers, they are inferior to the prior art arrangements, for example as described in EP 0521710. Very surprisingly the blowing performance significantly exceeds the performance of these prior art cables.

The hardness of the polymer of the second layer may be greater than or equal to a Shore hardness of 60 as measured by means of ISO R868.

The thickness of the second layer may be less than 400 microns around at least 10% of the circumference of the cable assembly.

It has been found to be beneficial for the outer layer to be relatively thin and certainly thinner than the 0.5 mm of foamed low density polyethylene in the arrangement of U.S. Pat. No. 4,952,021. This has the benefit that a harder material can be used without adversely affecting the bending properties of the cable.

Harder materials provide more robust cables with better resistance to abrasion during installation and improved protection of the fragile signal transmitting members. It is also the case that harder materials such as nylon or high density polyethylene have intrinsically better friction properties than other polymers comprising the outer layer of outer prior art cables such as low density polyethylene and acrylate polymer. Thus it may not be necessary to modify the polymer with antifriction agents considerably reducing the cost of the material of the outer layer and the cost of the process.

The second layer preferably has a thickness of less than 200 microns around at least 10% of the circumference of the cable assembly.

The second layer preferably has a thickness of less than 125 microns around at least 10% of the circumference of the cable assembly.

In a preferred embodiment, the second layer is adapted to be removed from said first layer by sliding over said first layer.

It has also been found to be beneficial for the outer layer not to be bonded to the inner layer. Indeed it is preferable that a small gap be provided between the two layers. This has the benefit that the outer hard polymeric material can be cut and removed from the inner layer by sliding it over the inner layer, providing easy access to the signal transmitting members for termination or splicing. This avoid the need for rip cords to longitudinally cut and remove the hard polymeric sheath. A second advantage of the small gap between the layers is that it provides an increase in diameter with no increase in weight, a desirable property for providing increased fluid drag and improved installation performance.

According to another aspect of the present invention, there is provided a cable assembly comprising a plurality of felxible signal transmitting members surrounded by a first layer such that axial movement of at least the outermost signal transmitting members relative to said first layer is restricted, and a continuous thermoplastic polymer second layer arranged outwardly of said first layer and having a thickness of less than 400 microns around at least 10% of the circumference of the cable assembly.

The second layer preferably has a thickness of less than 200 microns around at least 10% of the circumference of the cable assembly.

The second layer preferably has a thickness of less than 125 microns around at least 10% of the circumference of the cable assembly.

According to a further aspect of the present invention, there is provided a cable assembly comprising a plurality of flexible signal transmitting members surrounded by a first layer such that axial movement of at least the outermost signal transmitting members relative to said first layer is restricted, and a continuous thermoplastic polymer second layer arranged outwardly of said first layer and adapted to be removed from said first layer by sliding over said first layer.

The inner periphery of said second layer may be longer than the outer periphery of said first layer to enable removal of said second layer from the assembly.

The second layer may have a shore hardness greater than 60.

The second layer may comprise at least one polymer material.

At least one said polymer material may be a thermoplastic material.

At least one said polymer may be high-density polyethylene.

The flexible signal transmitting members may be embedded in said first layer.

Preferred embodiments of the present invention will now be described, by way of example only and not in any limitative sense, with reference to the accompanying drawings, in which.

Figure 1A:
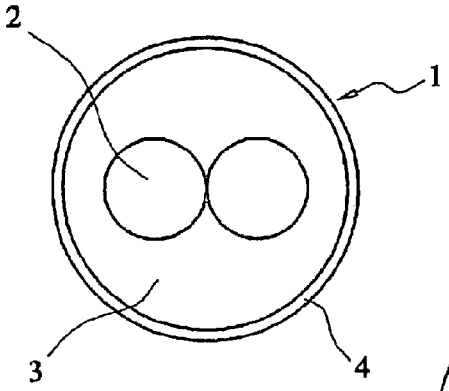
FIG. 1A is a schematic cross-sectional view of a fibre optic cable of a first embodiment of the present invention.
Figure 1B:
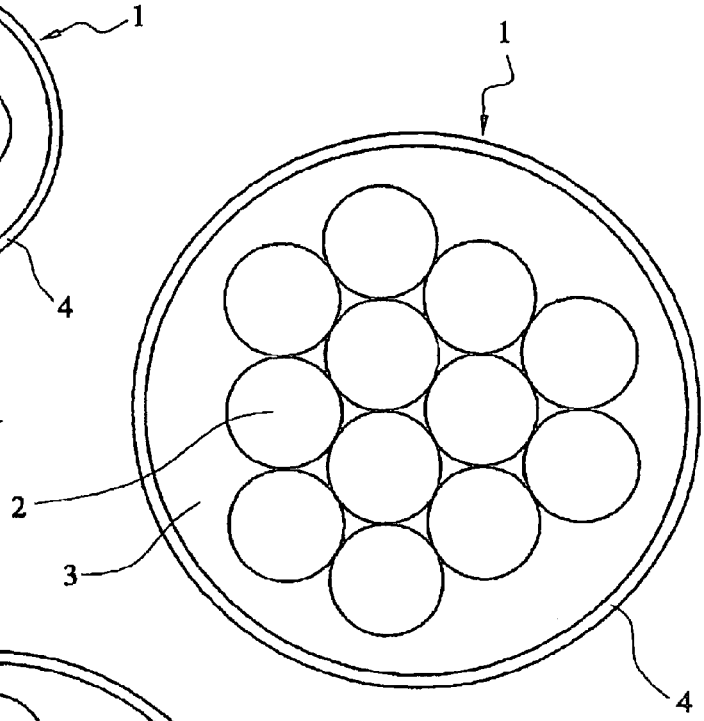
FIG. 1B is a schematic cross-sectional view of a fibre optic cable of a second embodiment of the present invention.
Figure 4A:
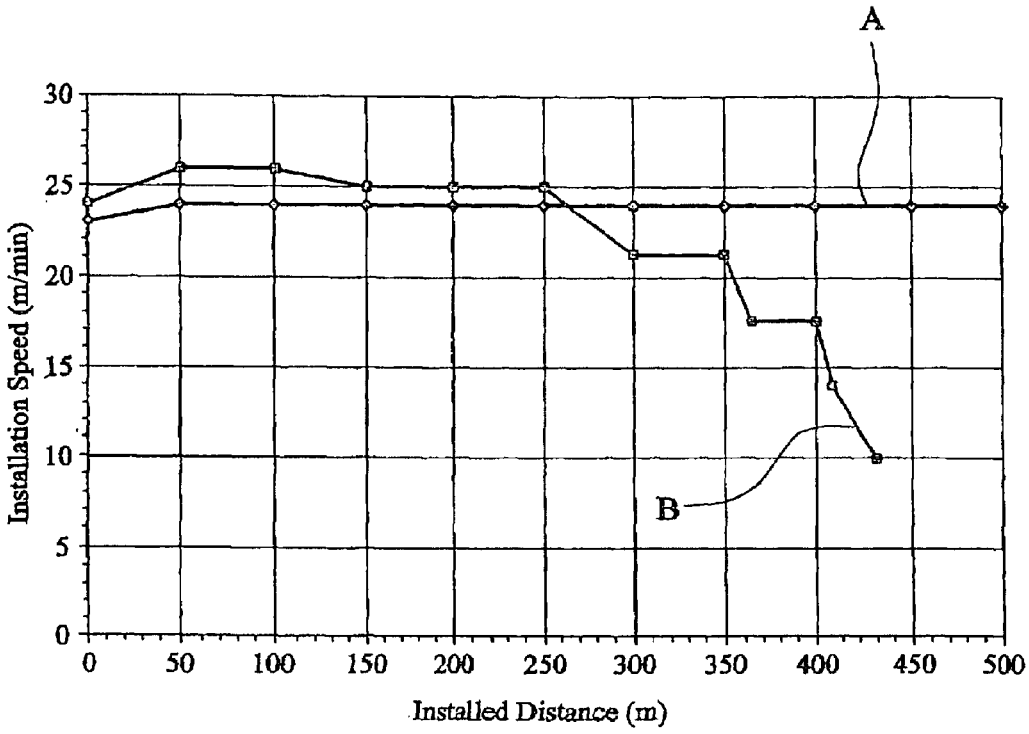
FIG. 4a illustrates the speed of installation and the total installed distance of the fibre optic cable of FIG. 1C into a duct, compared with the performance of a prior art cable constructed with the surface embodiment described in EP 0521710 and EP 646818, also containing 8 fibres.
Figure 4B:
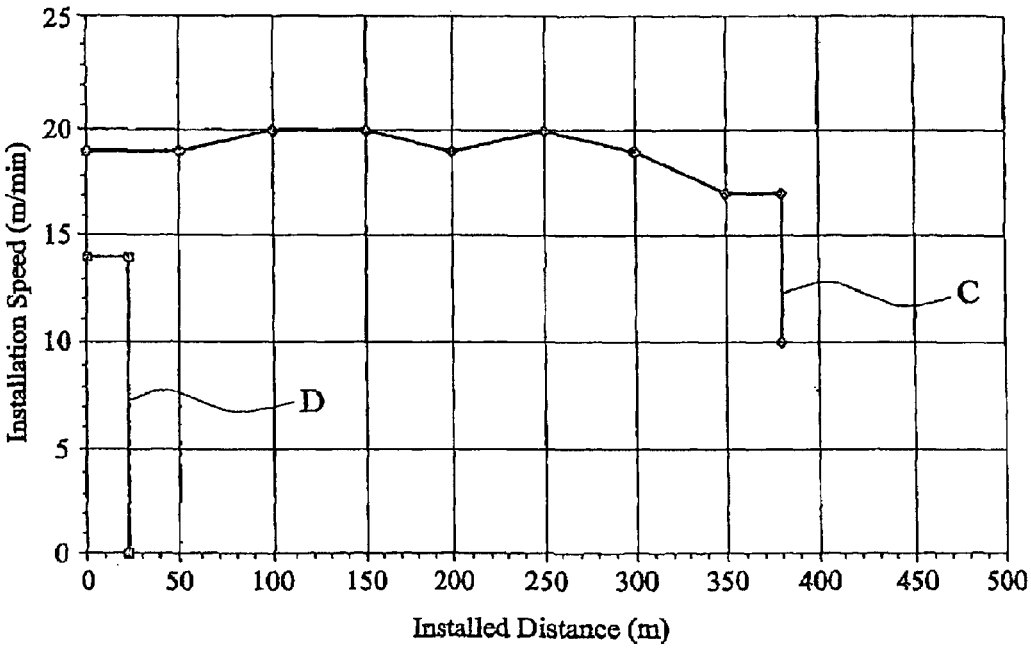
Figure 5:
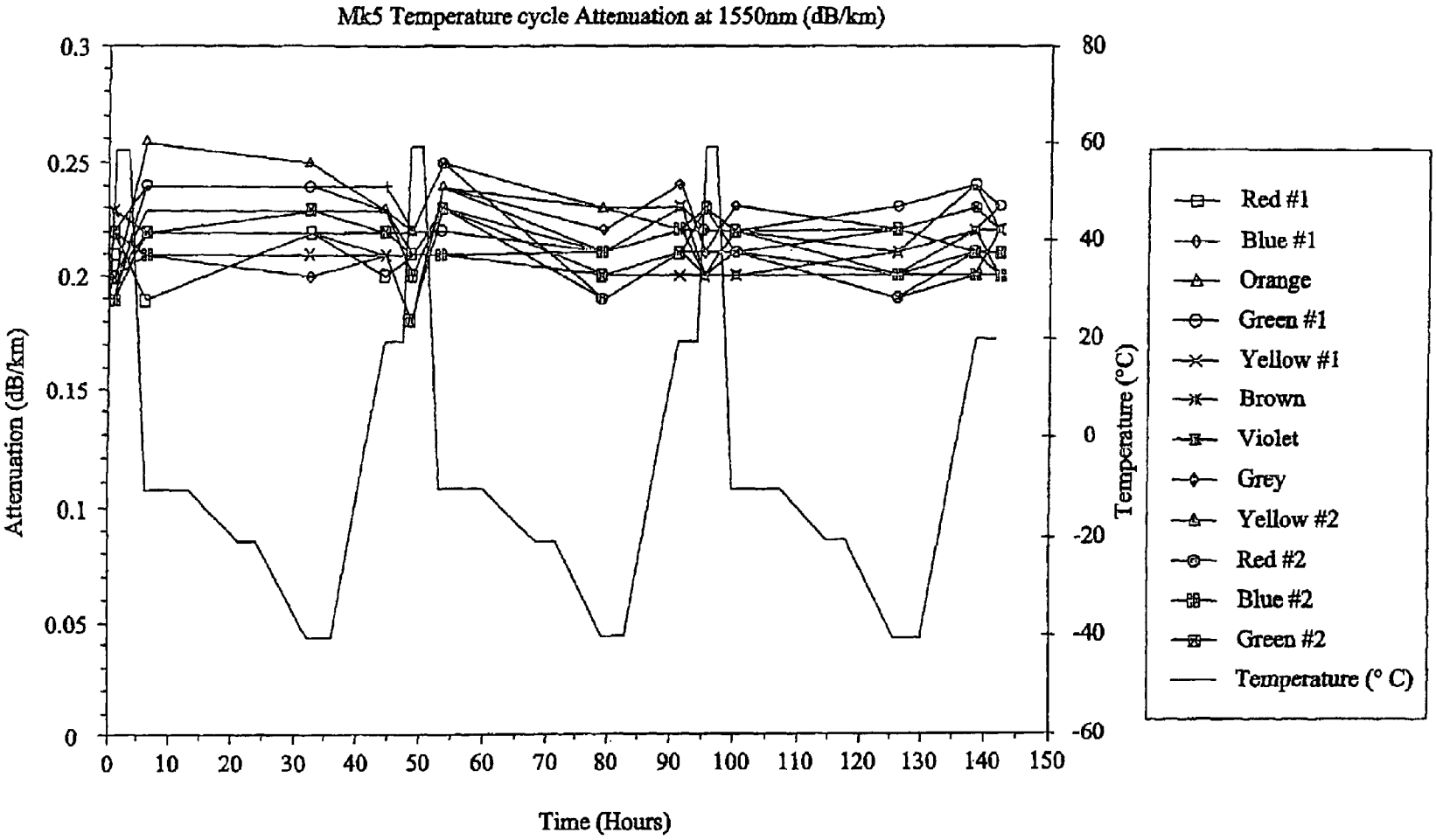

FIG. 4b illustrates the speed of installation and the total installed distance of the fibre optic cable of FIG. 1 B into a duct, compared with the performance of a prior art cable constructed with the surface modification described in EP 052170 and EP 616818, also containing 12 fibres; and FIG. 5 illustrates optical attenuation characteristics of the cable of FIG. 1B over a wide range of temperatures.

Referring to FIGS. 1A to 1D, a fibre optic cable 1 includes a core of primary coated optical fibres 2, which will be familiar to persons skilled in the art, embedded in an inner layer 3 of acrylate material having sufficient tensile strength when cured to lock at least the outermost fibres 2 in place and still allow the fibres to be easily broken out of the assembly for termination and splicing purposes. Suitable materials for this application are DSM Cabelite 950-706 and DSM Cabelite 3287-9-41. These materials are available from DSM Desotech BV. The hardness of the acrylate layer 3 is such that at least the outermost fibers 2 of the bundle are restricted from moving axially relative to the inner layer 3.

The inner layer 3 is then surrounded by a loose thin jacket 4 formed from a mixture of high density polyethylene having a Shore hardness greater than or equal to 60 as measured by means of ISO R868 and a generally uniformly distributed slip agent, including a polyether modified poly (dimethylsiloxane) material such as polyether modified hydroxy functional poly (dimethylsiloxane) material. The mixture from which the outer layer 4 is formed is compacted by means of heat and pressure. The outer layer 4 may also contain a mineral filler, such as calcium carbonate and/or titanium dioxide, in order to improve the stability of the dimensions of the outer layer 4 as the temperature changes.

In order to manufacture the cables 1 of FIGS. 1A to 1D, the primary coated optical fibres 2 are supplied from a bank of payoff reels (not shown), the number of reels being equal to the number of fibres 2 to be included in the cable 1. The fibres 2 are unwound with a generally constant traction force. The fibres 2 are then bundled together into a bundle of suitable shape, and are passed through a resin application station, where an acrylate resin forming the inner layer 3 is applied to the bundle of fibres 2, the acrylate resin being a UV-curing resin. The coated assembly of fibres 2 is then pulled through a series of curing ovens which cure the inner layer 3 to the desired dimensions. The above process can be carried out, for example, using a modified fibre ribbon line provided by Nextrom, Vantaa, Helsinki, Finland.

Figure 2:
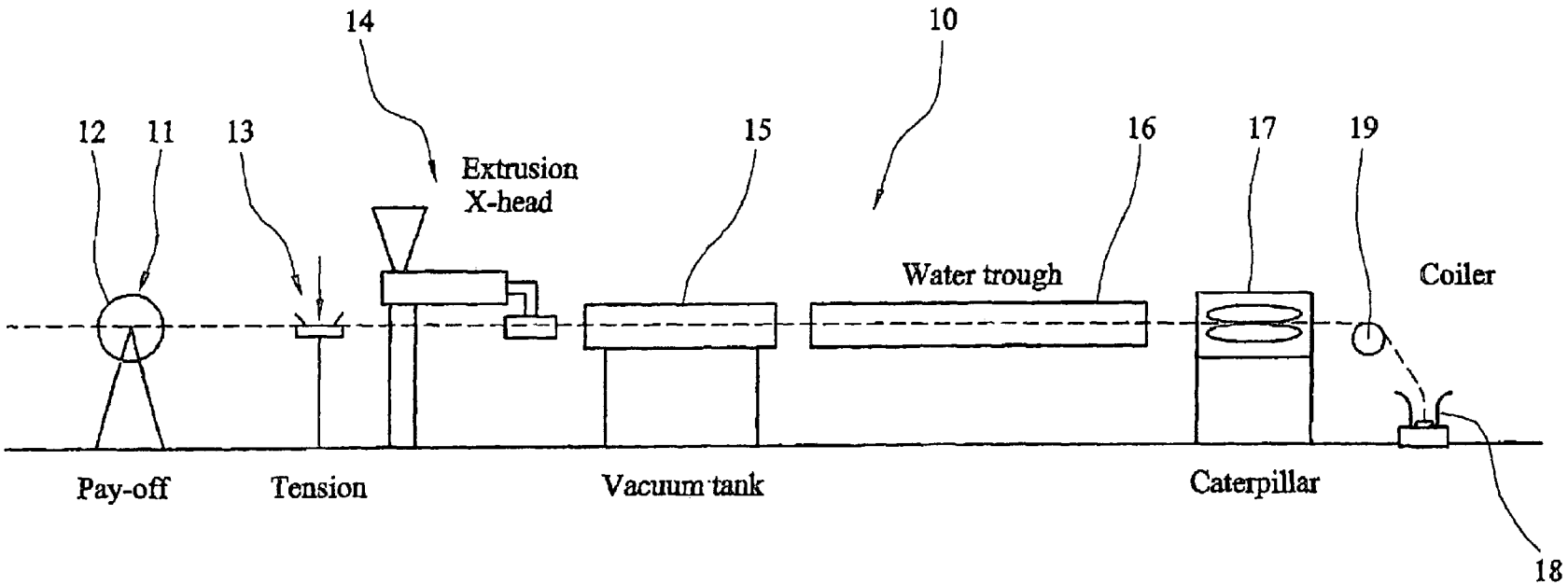
FIG. 2 is a schematic representation of apparatus for manufacturing the cables of FIGS. 1A to 1D.

Referring now to FIG. 2, the external coating 4, formed from a mixture of polymer and friction reducing material which has previously been compounded by means of heat and pressure, is applied to the inner layer 3 of the coated optical fibre bundle described above by pulling the coated fibre bundle through a thermoplastic extrusion line as shown in FIG. 2. Such a line is available from Nextrom Technologies, Nextrom S A, Route du Bois, 37 PO Box 259, CH-1024 Ecublens-Lausanne, Switzerland. The thermoplastic extrusion line 10 has a payoff stand 11 which allows the coated fibre bundle to be paid off a reel 12 at a generally steady rate. A tensioning device 13 ensures that the coated bundle is taut before entering an extrusion crosshead 14, which applies the mixture of high-density polyethylene incorporating the suitable silicon slip agent to the coated bundle at a temperature between 190 degrees C. and 230 degrees C.

The polyethylene coated cable is then pulled through a vacuum tank 15 which applies a vacuum to the outer coating 4 by surrounding it with water, the vacuum being between 100 mbar and 50 mbar, and also cools the fibre unit as it leaves the extrusion crosshead 14. Additional cooling is provided by pulling the cable through a water trough 16, the water being at a temperature of approximately 20 degrees C. A caterpillar unit 17 pulls the fibre unit through the entire thermoplastic extrusion line 10, the cable 1 then being coiled into a pan 18 by means of a coiler 19. It will be appreciated by persons skilled in the art that the two processes described above could be arranged in a single manufacturing line and the process completed in a single stage.

Figure 3:
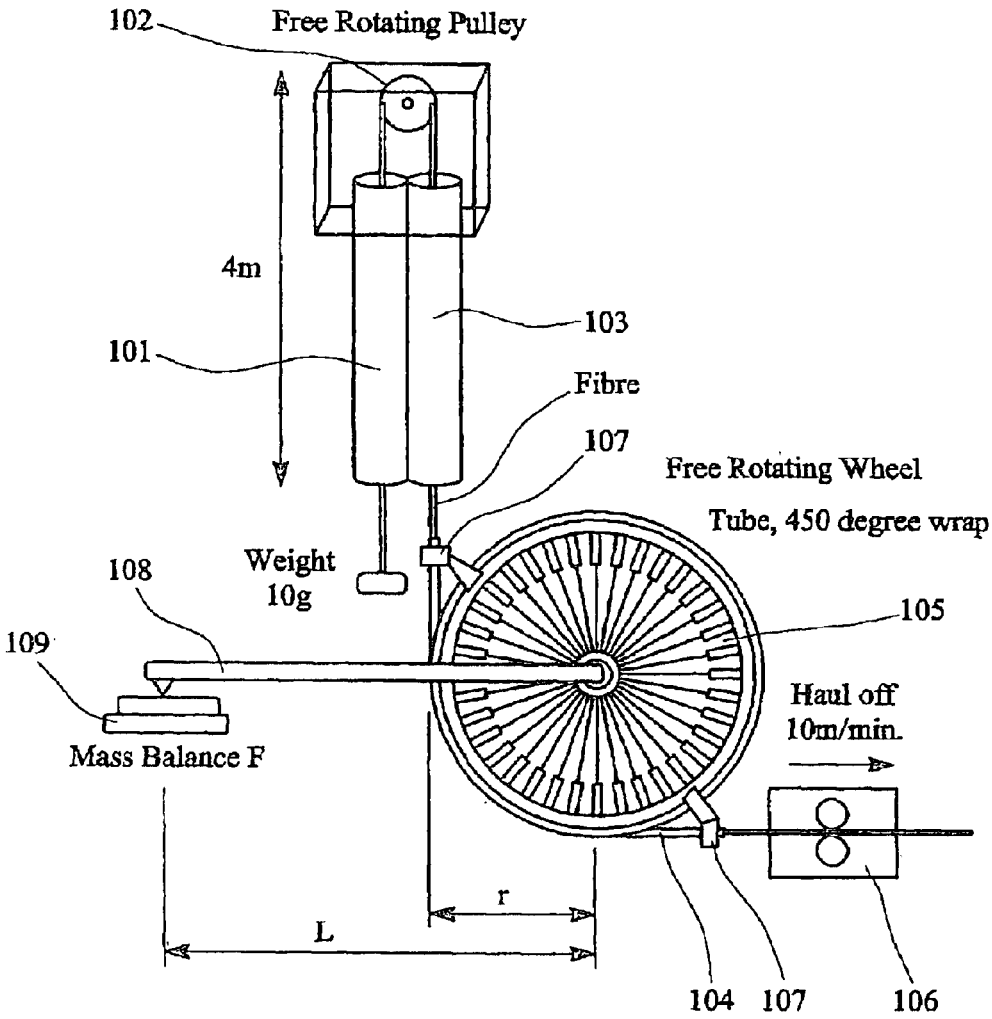
FIG. 3 is a drawing of the test equipment used to measure the coefficient of friction between cables and a tube suitable for installation of cables by blowing.

Referring to FIG. 3, this shows an apparatus for measuring the friction characteristics of the cables. Two cables, the first embodying the present invention and the second a commercially available cable with the surface modification described in EP 0521710 and EP 646818 were tested to measure their coefficient of friction relative to a tube manufactured commercially for use in blown cable applications.

The test method comprises attaching a weight of 10 grammes to one end of the cable and threading the other end through tube 101, around pulley 102, through tube 103 and then through a length of tube 104. The tube 104 is a commercially available tube with outside diameter 5 mm and internal diameter 3.5 mm manufactured for receiving installation of cables by blowing. The tube 104 is wrapped around a wheel 105 to provide a total of 450 degrees of wrapping. After the cable has been threaded through the tube 104 it is then inserted into a haul off 106, which pulls the cable at a constant speed of 10 metres per minute. The tube 104 is clamped at both ends by clamps 107, and as the cable is pulled through the tube 104, the friction of the cable on the tube imposes a turning moment on the wheel 105 and rotates a lever 108 which imposes a load on a mass balance 109.

The load on the mass balance 109 was measured for both the invention and the prior art and the coefficient of friction calculated using the formula:

Coefficient of friction is given by:

$$\mu = \frac{1}{\theta}\ln\left[\frac{FL}{Tr} + 1\right].$$

Where

θ total wrap angle of tube (rads)

F force recorded at mass balance (N)

L Moment arm length of force F (m)

T Weight lifted by fibre (N)

r Blend radius of primary tube (m)

The cable of the invention had a coefficient of friction of 0.27 whilst the cable of the prior art had a coefficient of friction of 0.21. The fiction characteristics of the invention are therefore inferior compared to those of the prior art.

Referring now to FIGS. 4a and 4b, the blowing performance of the cable, manufactured according to the above process is assessed by measuring the speed of installation and the total distance installed of the fibre unit into a suitable duct. The comparison involves an industry standard test in which 500 metres of a commercially available tube with outside diameter 5 mm and internal diameter 3.5 mm manufactured for receiving installation of cables by blowing, is wound onto a drum with barrel diameter of 500 mm.

Figure 1C:
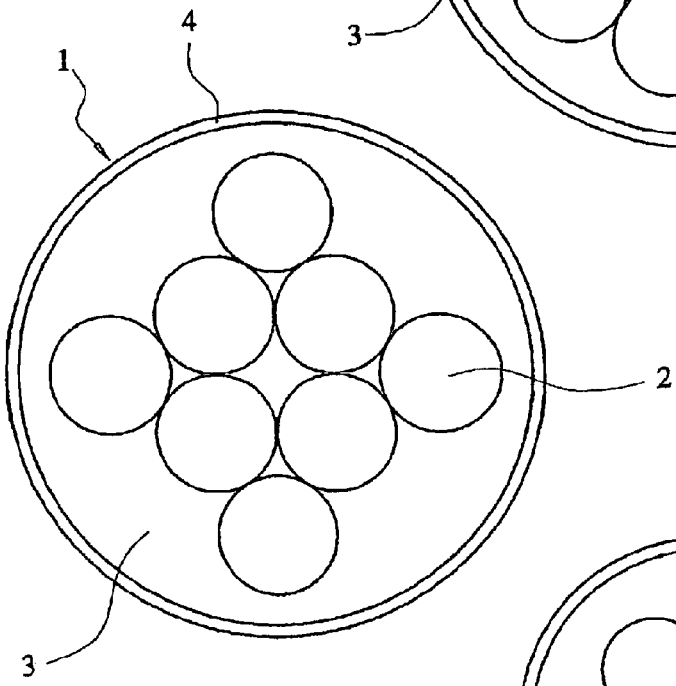
FIG. 1C is a schematic cross-sectional view of a fibre optic cable of a third embodiment of the present invention.
Figure 1D:
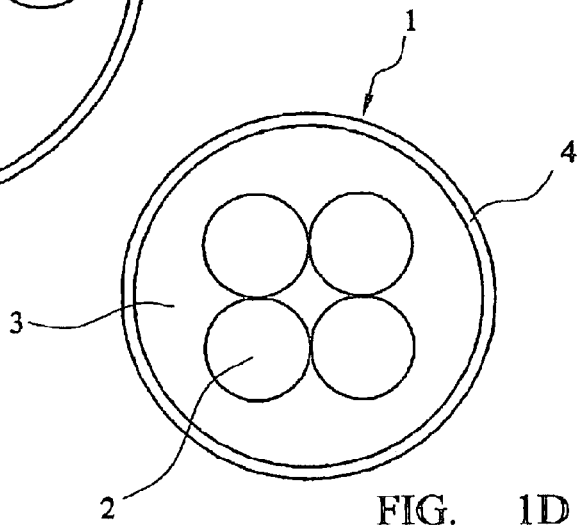
FIG. 1D is a schematic cross-sectional view of a fibre optic cable of a fourth embodiment of the present invention.

In the case of FIG. 4a, two fibre optic cables, the first being the cable of FIG. 1C (curve A) and the second a commercially available cable with the surface modification described in EP 0521710 and EP 646818 (curve B) are compared. Each of the cables contained 8 fibres arranged in their respective coatings. The cables of prior art and the invention were blown into the tube using industry standard blowing equipment, compressed air at 10 bar pressure and techniques identical for both cables.

In FIG. 4a, the blowing performance of the two cables is compared. It can be seen that the prior art product started to slow down after only 250 metres had been installed. At 430 metres the installation speed had declined to only 10 m/min. The cable of the invention, on the other hand, completed the test route at a constant speed of 24 m/min. In FIG. 4b the comparison is repeated except that this time the cables each contained 12 fibres, i.e. the cable of the invention is the cable of FIG. 1B. In this case the prior art cable (curve D) installed just 24 metres before stopping completely whilst the cable of the invention (curve C) completed a distance of 375 metres before stopping.

The blowing performance of FIGS. 4a and 4b represents a substantial and unexpected improvement compared to the prior art, particularly so in view of the fact that the cable of the invention has inferior friction properties and has a surface which had not been physically modified in any way to enhance fluid drag.

Referring now to FIG. 5, the signal low over a wide temperature range associated with cables manufactured according to the above process is shown. The different curves show signal attenuation in the individual fibres 2 of the cable of FIG. 1B. It can be seen that the cable 1 can withstand exposure to a wide temperature range. This is a surprising result. Prior art cables as described in EP0157610 incorporating polyethylene outer layers display poor optical performance below approximately B20 □C. This is usually attributed to a change of phase in polyethylene at around this temperature and for this reason polyethylene is not normally selected for the tight jacketing of fibre optic elements.

It will be appreciated by persons skilled in the art that the above embodiments have been described by way of example only, and not in any limitative sense, and that various alterations and modifications are possible with departure from the scope of the invention as defined by the appended claims. For example, as an alternative to, or in addition to, the friction reducing materials described in the above embodiments, erucamide and/or oleamide materials may be used as slip agents. Furthermore, although the cable assembly of the present invention comprises an inner and an outer layer, however, it will be obvious to those skilled in the art that it might be constructed from more than two layers.

The invention claimed is:

1. A cable assembly, comprising a plurality of flexible signal transmitting members surrounded by a first layer, wherein axial movement of at least the outermost of said signal transmitting members relative to said first layer is restricted, and further comprising a continuous thermoplastic polymer outermost layer arranged outwardly of said first layer, wherein the hardness of the polymer of said outermost layer is greater than or equal to a Shore D hardness of 60, *and wherein said cable is capable of being installed into a conduit by blowing of a compressed fluid, and wherein the thickness of said outermost layer is less than 400 microns around at least 10% of the circumference of said cable assembly*.

[2. The cable assembly of claim 1, wherein the hardness of the polymer of said outermost layer Is greater than or equal to a Shore D hardness of 60 as measured by means of ISO R868.]

[3. The cable assembly of claim 1, wherein the thickness of said outermost layer is less than 400 microns around at least 10% of the circumference of said cable assembly.]

4. The cable assembly of claim [3] *1*, wherein said outermost layer has a thickness of less than 200 microns around at least 10% of the circumference of said cable assembly.

5. The cable assembly of claim 4, wherein said outermost layer has a thickness of less than 125 microns around at least 10% of the circumference of said cable assembly.

6. The cable assembly of claim 1, wherein *the inner periphery of said outermost layer is longer than the outer periphery of said first layer so that* said outermost layer [is adapted to] *can* be removed from said first layer by sliding over said first layer.

7. [The cable assembly of claim 6] *A cable assembly, comprising a plurality of flexible signal transmitting members surrounded by a first layer, wherein axial movement of at least the outermost of said signal transmitting members relative to said first layer is restricted, and further comprising a continuous thermoplastic polymer outermost layer arranged outwardly of said first layer, wherein the hardness of the polymer of said outermost layer is greater than or equal to a Shore D hardness of 60, and wherein said cable is capable of being installed into a conduit by blowing of a compresses fluid*, wherein [the inner periphery of said outermost layer is longer than the outer periphery of said first layer] *when the conduit has an internal diameter of 3.5 mm, an external diameter of 5 mm, a length of 500 meters, the conduit is wound onto a drum having a barrel diameter of 500 mm, the compressed fluid comprises compressed air and said cable is installed by blowing compressed air into the conduit at 10 bar pressure the speed at which the cable is installed by blowing into the conduit is at least 10 meters per minute after at least 200 meters of said cable has been installed*.

8. The cable assembly of claim 1, wherein said inner layer comprises at least one acrylate material.

9. A cable assembly *capable of being installed into a tube by means of blowing, said cable assembly* comprising a plurality of flexible signal transmitting members arranged such that neighboring signal transmitting members are in touching contact with each other, said signal transmitting members being surrounded by a first layer, wherein axial movement of at least the outermost of said signal transmitting members relative to said first layer is [substantially prevented] *restricted*, and further comprising a continuous thermoplastic polymer [second] *outermost* layer arranged outwardly of said first layer, said [second] *outermost* layer having a thickness of less than 400 microns around at least 10% of the circumference of said cable assembly.

10. The cable assembly of claim 9, wherein said [second] *outermost* layer has a thickness of less than 200 microns around at least 10% of the circumference of said cable assembly.

11. The cable assembly of claim 10, wherein said [second] *outermost* layer has a thickness of less than 125 microns around at least 10% of the circumference of said cable assembly.

12. The cable assembly of claim 9, wherein the hardness of the polymer of said [second] *outermost* layer is greater than or equal to a Shore D hardness of 60.

13. The cable assembly of claim [9] *12*, wherein the hardness of the polymer of said [second] *outermost* layer is greater than or equal to a Shore D hardness of 60 as measured by means of ISO R868.

14. The cable assembly of claim 9, wherein said [second] *outermost* layer is adapted to be removed from said first layer by sliding over said first layer.

15. The cable assembly of claim 14, wherein the inner periphery of said [second] *outermost* layer is longer than the outer periphery of said first layer.

16. A cable assembly *that can be installed into a tube by blowing using compressed fluid, said cable assembly* comprising a plurality of flexible signal transmitting members surrounded by a first layer such that axial movement of at least the outermost signal transmitting members relative to said first layer is restricted, and [further comprising] a continuous thermoplastic polymer [second] *outermost* layer arranged outwardly of said first layer and adapted to be removed from said first layer by sliding over said first layer, *wherein when the tube has an internal diameter of 3.5 mm, an external diameter of 5 mm, a length of 500 meters, the tube is wound onto a drum having a barrel diameter of 500 mm, the compressed fluid comprises compressed air and said cable is installed by blowing compressed air into the tube at 10 bar pressure the speed at which the cable is installed by blowing into the tube is at least 10 meters per minute after at least 200 meters of said cable has been installed*.

17. The cable assembly of claim 16, wherein the inner periphery of said [second] *outermost* layer is longer than the outer periphery of said first layer to enable removal of said [second] *outermost* layer from said assembly.

18. The cable assembly of claim 16, whereIn said [second] *outermost* layer has a Shore D hardness greater than 60 .

19. The cable assembly of claim 18, wherein the hardness of the polymer of said [second] *outermost* layer is greater than or equal to a Shore D hardness of 60 as measured by means of ISO R868.

20. The cable assembly of claim 16, wherein the thickness of said [second] *outermost* layer is less than 400 microns around at least 10% of the circumference of said cable assembly.

21. The cable assembly of claim 20, wherein said [second] *outermost* layer has a thickness of less than 200 microns around at least 10% of the circumference of said cable assembly.

22. The cable assembly of claim 21, wherein said [second] *outermost* layer has a thickness of less than 125 microns around at least 10% of the circumference of said cable assembly.

23. The assembly of claim 16, wherein said [second] *outermost* layer comprises at least one polymer material.

24. The assembly of claim 23, wherein said at least one polymer material comprises a thermoplastic material.

25. The assembly of claim 23, wherein said at least one polymer material comprises high-density polyethylene.

26. The assembly of claim 16, wherein said signal transmitting members are embedded in said first layer.

*27. The cable assembly of claim 9, wherein when the tube has an internal diameter of 3.5 mm, an external diameter of 5 mm, a length of 500 meters, the tube is wound onto a drum having a barrel diameter of 500 mm, the compressed fluid comprises compressed air and said cable is installed by blowing compressed air into the tube at 10 bar pressure the speed at which the cable is installed by blowing into the tube is at least 10 meters per minute after at least 200 meters of said cable has been installed.*

*28. The cable assembly of claim 9, wherein when the tube has an internal diameter of 3.5 mm, an external diameter of 5 mm, a length of 500 meters, the tube is wound onto a drum having a barrel diameter of 500 mm, the compressed fluid comprises compressed air and said cable is installed by blowing compressed air into the tube at 10 bar pressure the speed at which the cable is installed by blowing into the tube is at least 10 meters per minute after at least 300 meters of said cable has been installed.*

*29. The cable assembly of claim 9, wherein when the tube has an internal diameter of 3.5 mm, an external diameter of 5 mm, a length of 500 meters, the tube is wound onto a drum having a barrel diameter of 500 mm, the compressed fluid comprises compressed air and said cable is installed by blowing compressed air into the tube at 10 bar pressure the speed at which the cable is installed by blowing into the tube is at least 10 meters per minute after at least 400 meters of said cable has been installed.*

*30. The cable assembly of claim 9, wherein when the tube has an internal diameter of 3.5 mm, an external diameter of 5 mm, a length of 500 meters, the tube is wound onto a drum having a barrel diameter of 500 mm, the compressed fluid comprises compressed air and said cable is installed by blowing compressed air into the tube at 10 bar pressure the speed at which the cable is installed by blowing into the tube is at least 10 meters per minute after at least 500 meters of said cable has been installed.*

*31. The cable assembly of claim 9, wherein said cable comprises 12 of said signal transmitting members, and wherein when the tube has an internal diameter of 3.5 mm, an external diameter of 5 mm, a length of 500 meters, the tube is wound onto a drum having a barrel diameter of 500 mm, the compressed fluid comprises compressed air and said cable is installed by blowing compressed air into the tube at 10 bar pressure said cable will be inserted into the tube at least 100 meters.*

*32. The cable assembly of claim 9, wherein said cable comprises 12 of said signal transmitting members, and wherein when the tube has an internal diameter of 3.5 mm, an external diameter of 5 mm, a length of 500 meters, the tube is wound onto a drum having a barrel diameter of 500 mm, the compressed fluid comprises compressed air and said cable is installed by blowing compressed air into the tube at 10 bar pressure said cable will be inserted into the tube at least 150 meters.*

*33. The cable assembly of claim 9, wherein said cable comprises 12 of said signal transmitting members, and wherein when the tube has an internal diameter of 3.5 mm, an external diameter of 5 mm, a length of 500 meters, the tube is wound onto a drum having a barrel diameter of 500 mm, the compressed fluid comprises compressed air and said cable is installed by blowing compressed air into the tube at 10 bar pressure said cable will be inserted into the tube at least 200 meters.*

*34. The cable assembly of claim 9, wherein said cable comprises 12 of said signal transmitting members, and wherein when the tube has an internal diameter of 3.5 mm, an external diameter of 5 mm, a length of 500 meters, the tube is wound onto a drum having a barrel diameter of 500 mm, the compressed fluid comprises compressed air and*

*said cable is installed by blowing compressed air into the tube at 10 bar pressure said cable will be inserted into the tube at least 250 meters.*

*35. The cable assembly of claim 16, wherein when the tube has an internal diameter of 3.5 mm, an external diameter of 5 mm, a length of 500 meters, the tube is wound onto a drum having a barrel diameter of 500 mm, the compressed fluid comprises compressed air and said cable is installed by blowing compressed air into the tube at 10 bar pressure the speed at which the cable is installed by blowing into the tube is at least 10 meters per minute after at least 300 meters of said cable has been installed.*

*36. The cable assembly of claim 16, wherein when the tube has an internal diameter of 3.5 mm, an external diameter of 5 mm, a length of 500 meters, the tube is wound onto a drum having a barrel diameter of 500 mm, the compressed fluid comprises compressed air and said cable is installed by blowing compressed air into the tube at 10 bar pressure the speed at which the cable is installed by blowing into the tube is at least 10 meters per minute after at least 400 meters of said cable has been installed.*

*37. The cable assembly of claim 16, wherein when the tube has an internal diameter of 3.5 mm, an external diameter of 5 mm, a length of 500 meters, the tube is wound onto a drum having a barrel diameter of 500 mm, the compressed fluid comprises compressed air and said cable is installed by blowing compressed air into the tube at 10 bar pressure the speed at which the cable is installed by blowing into the tube is at least 10 meters per minute after at least 500 meters of said cable has been installed.*

*38. The cable assembly of claim 16, wherein said cable comprises 12 of said signal transmitting members, and wherein when the tube has an internal diameter of 3.5 mm, an external diameter of 5 mm, a length of 500 meters, the tube is wound onto a drum having a barrel diameter of 500 mm, the compressed fluid comprises compressed air and said cable is installed by blowing compressed air into the tube at 10 bar pressure will insert said cable into the tube at least 100 meters.*

*39. The cable assembly of claim 16, wherein said cable comprises 12 of said signal transmitting members, and wherein when the tube has an internal diameter of 3.5 mm, an external diameter of 5 mm, a length of 500 meters, the tube is wound onto a drum having a barrel diameter of 500 mm, the compressed fluid comprises compressed air and said cable is installed by blowing compressed air into the tube at 10 bar pressure said cable will be inserted into the tube at least 150 meters.*

*40. The cable assembly of claim 16, wherein said cable comprises 12 of said signal transmitting members, and wherein when the tube has an internal diameter of 3.5 mm, an external diameter of 5 mm, a length of 500 meters, the tube is wound onto a drum having a barrel diameter of 500 mm, the compressed fluid comprises compressed air and said cable is installed by blowing compressed air into the tube at 10 bar pressure said cable will be inserted into the tube at least 200 meters.*

*41. The cable assembly of claim 16, wherein said cable comprises 12 of said signal transmitting members, and wherein when the tube has an internal diameter of 3.5 mm, an external diameter of 5 mm, a length of 500 meters, the tube is wound onto a drum having a barrel diameter of 500 mm, the compressed fluid comprises compressed air and said cable is installed by blowing compressed air into the tube at 10 bar pressure said cable will be inserted into the tube at least 250 meters.*

*42. A cable assembly, comprising a plurality of flexible signal transmitting members surrounded by a first layer, wherein axial movement of at least the outermost of said signal transmitting members relative to said first layer is restricted, and further comprising a continuous thermoplastic polymer outermost layer arranged outwardly of said first layer, wherein the hardness of the polymer of said outermost layer is greater than or equal to a Shore D hardness of 60, and wherein said cable is capable of being installed into a conduit by blowing of a compressed fluid, wherein when the conduit has an internal diameter of 3.5 mm, an external diameter of 5 mm, a length of 500 meters, the conduit is wound onto a drum having a barrel diameter of 500 mm, the compressed fluid comprises compressed air and said cable is installed by blowing compressed air into the conduit at 10 bar pressure the speed at which the cable is installed by blowing into the conduit is at least 10 meters per minute after at least 300 meters of said cable has been installed.*

*43. The cable assembly of claim 42, wherein when the conduit has an internal diameter of 3.5 mm, an external diameter of 5 mm, a length of 500 meters, the conduit is wound onto a drum having a barrel diameter of 500 mm, the compressed fluid comprises compressed air and said cable is installed by blowing compressed air into the conduit at 10 bar pressure the speed at which the cable is installed by blowing into the conduit is at least 10 meters per minute after at least 400 meters of said cable has been installed.*

*44. The cable assembly of claim 42, wherein when the conduit has an internal diameter of 3.5 mm, an external diameter of 5 mm, a length of 500 meters, the conduit is wound onto a drum having a barrel diameter of 500 mm, the compressed fluid comprises compressed air and said cable is installed by blowing compressed air into the conduit at 10 bar pressure the speed at which the cable is installed by blowing into the conduit is at least 10 meters per minute after at least 500 meters of said cable has been installed.*

*45. A cable assembly, comprising a plurality of flexible signal transmitting members surrounded by a first layer, wherein axial movement of at least the outermost of said signal transmitting members relative to said first layer is restricted, and further comprising a continuous thermoplastic polymer outermost layer arranged outwardly of said first layer, wherein the hardness of the polymer of said outermost layer is greater than or equal to a Shore D hardness of 60, and wherein said cable is capable of being installed into a conduit by blowing of a compressed fluid, wherein when said cable comprises 12 of said signal transmitting members, and wherein when the conduit has an internal diameter of 3.5 mm, an external diameter of 5 mm, a length of 500 meters, the conduit is wound onto a drum having a barrel diameter of 500 mm, the compressed fluid comprises compressed air and said cable is installed by blowing compressed air into the conduit at 10 bar pressure said cable will be inserted into the conduit at least 100 meters.*

*46. The cable assembly of claim 45, wherein said cable comprises 12 of said signal transmitting members, and wherein when the conduit has an internal diameter of 3.5 mm, an external diameter of 5 mm, a length of 500 meters, the conduit is wound onto a drum having a barrel diameter of 500 mm, the compressed fluid comprises compressed air and said cable is installed by blowing compressed air into the conduit at 10 bar pressure said cable will be inserted into the conduit at least 150 meters.*

*47. The cable assembly of claim 45, wherein said cable comprises 12 of said signal transmitting members, and wherein when the conduit has an internal diameter of 3.5 mm, an external diameter of 5 mm, a length of 500 meters, the conduit is wound onto a drum having a barrel diameter of 500 mm, the compressed fluid comprises compressed air*

*and said cable is installed by blowing compressed air into the conduit at 10 bar pressure said cable will be inserted into the conduit at least 200 meters.*

*48. The cable assembly of claim 45, wherein said cable comprises 12 of said signal transmitting members, and wherein when the conduit has an internal diameter of 3.5 mm, an external diameter of 5 mm, a length of 500 meters, the conduit is wound onto a drum having a barrel diameter of 500 mm, the compressed fluid comprises compressed air and said cable is installed by blowing compressed air into the conduit at 10 bar pressure said cable will be inserted into the conduit at least 250 meters.*

*49. A cable assembly, comprising a plurality of flexible signal transmitting members surrounded by a first layer, wherein axial movement of at least the outermost of said signal transmitting members relative to said first layer is restricted, and further comprising a continuous thermoplastic polymer outermost layer arranged outwardly of said first layer, wherein the hardness of the polymer of said outermost layer is greater than or equal to a Shore D hardness of 60, and wherein said cable is capable of being installed into a conduit by blowing of a compressed fluid, wherein said cable is capable of being installed by blowing into a conduit having an internal diameter of 3.5 mm, an external diameter of 5 mm, the conduit being wound onto a drum having a diameter of 500 mm, wherein when said cable is inserted by blowing into the conduit at 10 bar pressure the speed at which the cable is inserted by blowing into the conduit is at least 10 meters per minute after at least 430 meters of said cable has been installed.*

*50. A cable assembly, comprising a plurality of flexible signal transmitting members surrounded by a first layer, wherein axial movement of at least the outermost of said signal transmitting members relative to said first layer is restricted, and further comprising a continuous thermoplastic polymer outermost layer arranged outwardly of said first layer, wherein the hardness of the polymer of said outermost layer is greater than or equal to a Shore D hardness of 60, and wherein said cable is capable of being installed into a conduit by blowing of a compressed fluid, wherein when said cable comprises 12 of said signal transmitting members it is capable of being installed by blowing into a conduit having an internal diameter of 3.5 mm, an external diameter of 5 mm, the conduit being wound onto a drum having a diameter of 500 mm, wherein when said cable is inserted by blowing at 10 bar pressure said cable will be inserted into the conduit at least 375 meters.*

*51. A cable assembly, comprising a plurality of flexible signal transmitting members surrounded by a first layer, wherein axial movement of at least the outermost of said signal transmitting members relative to said first layer is restricted, and further comprising a continuous thermoplastic polymer outermost layer arranged outwardly of said first layer, wherein the hardness of the polymer of said outermost layer is greater than or equal to a Shore D hardness of 60, wherein said cable is capable of being installed into a conduit by blowing of a compressed fluid, and wherein when the conduit has an internal diameter of 3.5 mm, an external diameter of 5 mm, a length of 500 meters, the conduit is wound onto a drum having a barrel diameter of 500 mm, the compressed fluid comprises compressed air and said cable is installed by blowing compressed air into the conduit at 10 bar pressure the speed at which the cable is installed by blowing into the conduit is at least 10 meters per minute after at least 200 meters of said cable has been installed.*

*52. The cable assembly of claim 51, wherein the thickness of said outermost layer is less than 400 microns around at least 10% of the circumference of said cable assembly.*

*53. The cable assembly of claim 52, wherein said outermost layer has a thickness of less than 200 microns around at least 10% of the circumference of said cable assembly.*

*54. The cable assembly of claim 53, wherein said outermost layer has a thickness of less than 125 microns around at least 10% of the circumference of said cable assembly.*

*55. The cable assembly of claim 51, wherein the inner periphery of said outermost layer is longer than the outer periphery of said first layer so that said outermost layer can be removed from said first layer by sliding over said first layer.*

*56. The cable assembly of claim 51, wherein said inner layer comprises at least one acrylate material.*

* * * * *